Sept. 29, 1970
D. C. LOUDON
3,531,670
ROTARY ELECTRICAL APPARATUS HAVING METALLIC SLEEVE FOR EMBRACING
THE PERIPHERAL SECTIONS OF PERMANENT MAGNET ROTOR
Filed Sept. 16, 1968
2 Sheets-Sheet 1
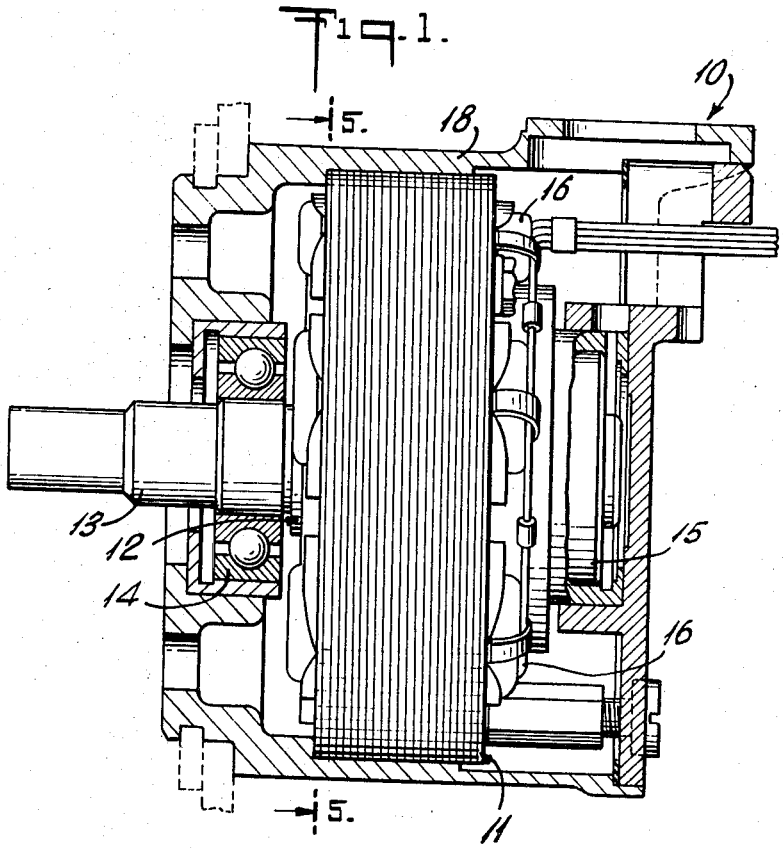
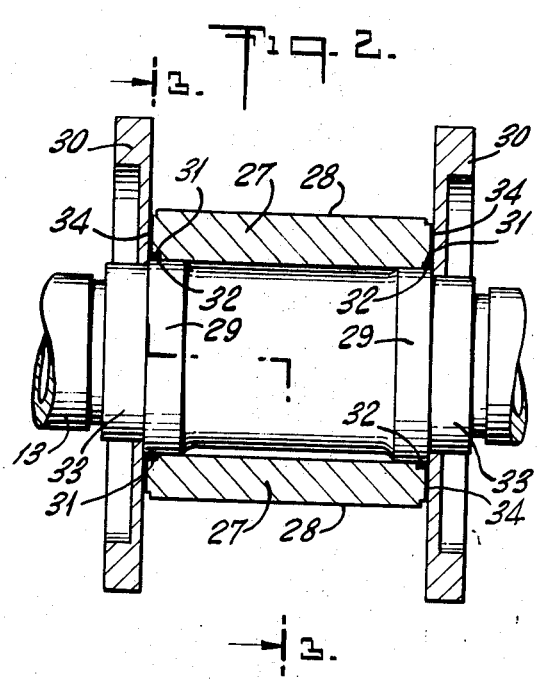
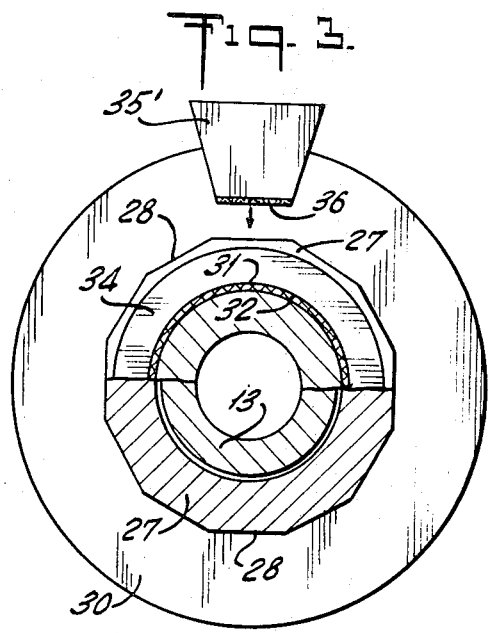
INVENTOR
DONALD C. LOUDON
BY
Bauer and Seymour
ATTORNEYS

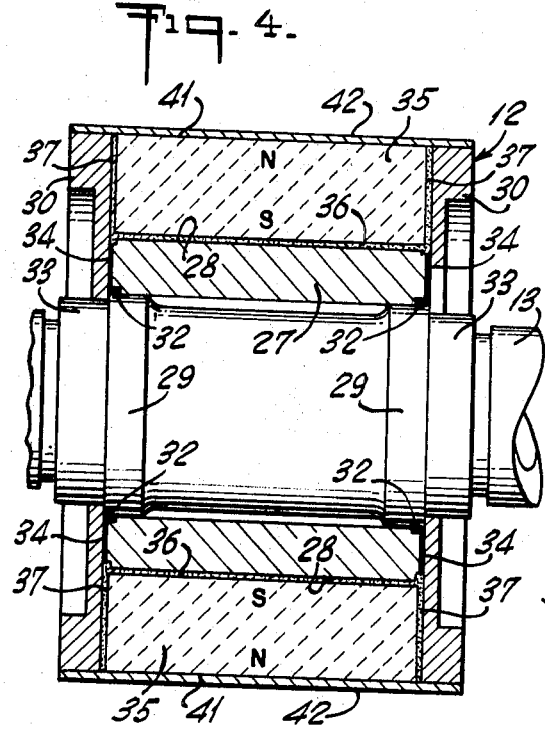

United States Patent Office 3,531,670
Patented Sept. 29, 1970

3,531,670
ROTARY ELECTRICAL APPARATUS HAVING METALLIC SLEEVE FOR EMBRACING THE PERIPHERAL SECTIONS OF PERMANENT MAGNET ROTOR
Donald C. Loudon, Sidney, N.Y., assignor to The Bendix Corporation, a corporation of Delaware
Filed Sept. 16, 1968, Ser. No. 759,834
Int. Cl. H02k 21/12
U.S. Cl. 310—156          23 Claims

ABSTRACT OF THE DISCLOSURE

An electric generator or motor comprising a multipole, wound stator and a multi-pole rotor having an equal number of poles fabricated from a plurality of circumferentially-arranged, radially-magnetized permanent magnets secured, such as by an adhesive, to each other, to an inner flux conducting ring and to a supporting rotary structure, the rotor being further structurally stabilized against centrifugal forces by a sleeve tightly embracing the outer peripheral surface thereof. Adjacent magnets are of opposite polarity and coils are wound on alternate poles of the stator and connected to provide a plurality of sources of electrical energy.

---

This invention relates to rotary electrical apparatus such as electrical generators and motors. More particularly, the invention relates to an improved rotor incorporating a ceramic magnet or magnets, and to the combination of such rotor with a stator which cooperates therewith in a novel manner.

Ceramic magnets have a high coercive force and are lighter than metal magnets such as those made of alnico. Ceramic magnets do not, however, possess the mechanical strength of metal magnets; their use in the rotor of rotary electrical apparatus has heretofore presented problems as to the secure retention of the magnets on the rotor without the danger of injury to or the breakage of the magnets under service conditions under which they are subjected to very substantial forces, including centrifugal force.

In the illustrative embodiment of the present invention, the rotor of the apparatus incorporates a ceramic magnet made in sections bounded by radial axial planes. The rotor is provided with a flux carrier sleeve telescoped over and secured to the rotor shaft. Non-magnetic annular members which form flanges on the rotor shaft are secured thereto at each end of the flux carrier sleeve. In assembling the rotor, the magnet sections are preliminarily adhered to the flux carrier sleeve by a first layer of adhesive which is then cured. After the curing of such first adhesive layer, the preliminarily assembled rotor is put into a mold and is vacuum impregnated with a second curable adhesive which penetrates the assembly between the substantially abutting faces of successive magnets and the end faces of the magnets and their retaining flanges. The thus impregnated rotor is removed from the mold and the second adhesive is cured. After this, the peripheral surface of the rotor is ground down to a circular cylinder of the desired diameter, and a non-magnetic magnet retaining sleeve is then heat shrunk on the rotor over the peripheries of the magnet sections and the magnet retaining flanges. The magnet sections are thus securely held in place on the body of the rotor against separation therefrom by both axially directed forces and radially outwardly directed centrifugal forces.

After the rotor has been thus assembled, the composite magnet thereon is magnetized so as to have a plurality of equally angularly spaced outer poles, successive outer poles being of opposite polarity, and the same number of inner poles adjacent the flux carrier, radially aligned with and of opposite polarity from the respective outer poles.

The stator of the apparatus of the invention is provided with a plurality of pole pieces equally angularly spaced thereabout, the number of pole pieces on the stator being the same as the number of outer magnetic poles on the rotor. A coil is magnetically associated with alternate pole pieces of the stator. In the illustrative embodiment the generator is employed as a plurality of separate continuous alternating current sources, each source having two successive coils on the stator wound in the same direction and connected in series.

The invention has among its objects the provision of rotary electrical apparatus having a rotor incorporating a ceramic permanent magnet which is secured to the body of the rotor by novel means.

Another object of the invention is the provision of a rotor incorporating a ceramic magnet wherein the magnet is at least partially retained by cured rigid adhesive which holds it securely to the body of the rotor.

A further object of the invention lies in the provision of a rotor of the type indicated wherein the magnet is formed of a plurality of segments and wherein such segments are connected to each other and to the rotor body at least partially by rigid cured adhesive.

Still another object of the invention lies in the provision of the combination of a rotor and stator wherein the magnetic poles on the rotor and the pole pieces and coils on the stator are so related that the generator may serve as a plurality of separate sources of continuous alternating current.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in vertical axial section through a generator in accordance with the invention, certain of the parts being shown in elevation;

FIG. 2 is a view partially in vertical axial section and partially in elevation of a first embodiment of rotor for the generator of FIG. 1 in a preliminary stage of its assembly;

FIG. 3 is a view in transverse section through the rotor in a later stage of its assembly, a magnet segment being shown about to be assembled upon the rotor body, the view being taken along the broken section line 3—3 of FIG. 2;

FIG. 4 is a view partially in axial section and partially in side elevation of the completed first embodiment of rotor, the composite ceramic magnet of the rotor having been magnetized as shown;

FIG. 5 is a somewhat simplified view in transverse section through the generator, the section being taken along the line 5—5 of FIG. 1, the instantaneous polarity of the stator poles being indicated; and FIG. 6 is a view in transverse section through a second embodiment of rotor in accordance with the invention, the section being taken similarly to that of FIG. 5.

A generator in accordance with the invention is shown in FIGS. 1 and 5, where it is generally designated 10. Such generator has a stator 11 formed of a plurality of laminations, the stator being telescoped within and secured to a housing 18 by longitudinal bolts in the conventional manner. The rotor 12 of the generator has a rotor shaft 13 which is journalled in the housing 18 in a forward bearing 14 and a rear bearing 15. The stator has a plurality of equally angularly spaced pole pieces 17 (FIG. 5), pole pieces 17 being separated by a plurality of equally angularly spaced alternate pole pieces 19 having no winding or coil thereabout. A coil 16 is wound about each of the pole pieces 17, in the embodiment shown there being six coils formed as sets of two successive coils. The coils in each set are wound in the same direction and are connected in series. There are thus formed three separate sources of continuous alternating current, the first source having the leads 20, 21, the second having the leads 22, 24, and the third having the leads 25, 26.

The rotor shaft 13 is made of non-magnetic metal such as stainless steel. Telescoped over and secured to the shaft 13 is a flux carrier sleeve 27 which is made of magnetic metal. Sleeve 27 has a circular cylindrical inner surface which accurately receives enlarged circular cylindrical zones 29 on the rotor shaft. The outer surface of the sleeve is formed as an equilateral dodecagon having identical flat surfaces 28 to which the roots of the magnet segments are to be adhered as will be explained. Two oppositely disposed annular members 30, with flat inner faces, which function as magnet retaining flanges on the rotor are secured to the rotor shaft 13 at the opposite ends of the flux carrier sleeve 27.

The sleeve 27 and the annular members 30 are bonded to the rotor shaft 13 by being brazed thereto. Thus brazing rings 32 are placed in annular recesses 31 at the ends of the inner surface of the sleeve 27, and the parts 13, 27, 30, and 32, assembled as shown in FIG. 2, are placed in a furnace where they are heated under non-oxidizing conditions so as to melt the brazing rings 32. The brazing metal flows into the interfaces between the zones 29 on the rotor shaft 13 and the inner surface of the sleeve 27 as shown in an exaggerated manner at 32 in FIG. 3, between the ends of the sleeve 27 and the confronting surfaces of the annular members 30, and between the surfaces of the central bores in members 30 and the confronting surfaces of zones 33 of the rotor shaft 13. There is thus provided a strong rigid unitary rotor body.

After the formation of the rotor body a plurality of unfinished magnet segments 35' (12 in this instance) are assembled thereon, in the manner schematically indicated in FIG. 3, with the roots of the magnet segments seated upon the respective surfaces 28 of the flux carrier sleeve 27. Prior to such assembly of the magnet segments upon the rotor body, a layer 36 of curable adhesive such as an epoxy resin is coated upon the roots of the segments 35' as shown, upon the surfaces 28, or both. The layers 36 of adhesive are then cured so that the magnet segments 35' are held secured on the rotor body during subsequent assembly operations. The rotor body with the magnet segments assembled thereon is then placed in a mold wherein it is vacuum impregnated with a second curable resin such as an epoxy resin adhesive. The second adhesive flows into any interstices which exist in the assembly to form thin layers 37 of adhesive between the end surfaces of the magnet segments 35' and the annular members 30, and thin layers 39 of adhesive between the confronting radial faces of successive magnet segments 35'. The thickness of adhesive layers 37 and 39 are exaggerated in FIGS. 4 and 5 for clarity of illustration.

The rotor is then removed from the mold and the second adhesive is cured. Following this, the peripheral surfaces of the magnet segments 35' and, of course, whatever layer of second adhesive may have been deposited upon their outer surfaces are ground down to a circular cylindrical surface 41 having the desired diameter. A thin outer, magnet retaining sleeve 42 made of strong non-magnetic metal such as Inconel is then heat shrunk upon the rotor, the sleeve 42 being of such axial length that its ends lie coplanar with the axially outer annular surfaces of the members 30. Finally, the magnet segments, now designated 35, are magnetized as indicated in FIGS. 4 and 5 so that the radially outer ends of successive magnet segments are of opposite polarity, and the inner ends of the magnet segments are of a polarity opposite from that of their outer ends.

It will be seen from FIG. 5 that the rotor has a number of magnetic poles which is twice the number of the wound pole pieces 17 of the stator. Each coil 16 functions to deliver a continuous alternating current as the poles of the rotor traverse its pole piece. In the embodiment shown, sets of two successive coils are wound in the same direction and are series connected to yield a voltage which is twice that of each coil. Thus the illustrative generator may, if desired, serve to supply current for three separate functions. It is to be understood that the coils 16 may, if desired, be connected in various other manners to obtain the desired number of alternating current sources having the desired voltage and current output or power output.

In FIG. 6 there is shown a second embodiment of rotor in accordance with the invention. Such rotor, which is designated 12', differs from rotor 12 of the first embodiment by having the magnet thereof made in four sections rather than 12, by having the inner and outer surfaces of the magnet sections as initially supplied formed as parts of circular cylinders, and by having axially extending zones of the magnet retaining sleeve overlying the magnetic poles on the rotor made of magnetic material. Accordingly, the outer surface of the flux carrier sleeve 27' is circular cylindrical. The magnet segments 45 are assembled as in the first embodiment, that is, by being preliminarily adhesively secured to the flux carrier sleeve by a first adhesive layer 46 and, after the curing of the first adhesive, by being vacuum impregnated with a second adhesive which further secures the magnet sections to the flange forming members on the rotor and to each other by adhesive layers, the latter of which are shown at 47. As before, the adhesive layers are shown of exaggerated thickness. The rotor as thus far assembled is then ground to bring the outer surfaces of the magnet sections into an accurate circular cylindrical surface, following which a magnet retaining sleeve 49 is heat shrunk upon the magnet sections of the rotor and the end flanges thereof.

Since the rotor 12' here shown is adapted to be employed with a stator constructed as shown in FIG. 5, the composite magnet thereof is in effect magnetized in the same manner as the rotor of the first embodiment. In this instance, each of the magnet sections 45 is magnetized so as to have three outer magnetic poles of alternating polarity, and three inner poles radially aligned therewith, the outer and inner poles, which are of opposite polarity, being equally angularly spaced about the axis of the rotor.

The magnet retaining sleeve 49 in this embodiment is composed of longitudinally extending non-magnetic parts 50 and longitudinally extending parts 51 alternating therewith and overlying the magnetic poles of the rotor. The parts 50 and 51 may be made of non-magnetic and magnetic metal, respectively, edge welded together to form a continuous sleeve. Such construction of the sleeve results in a generator of improved efficiency due to the reduction of the length of the gap between the magnetic materials of the rotor and stator.

The generator of the invention has reliable high speed capability. The use of ceramic magnets in the rotor results in a stable rotor which is not subject to transient short circuit knockdown. The rotor therefore does not require damper rings and/or bars as in the case of generators incorporating Alnico material.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

Thus the coils of the stator may be wound on every pole when a conventional type of stator lamination is used. The non-magnetic magnet retaining sleeve of the first embodiment and the non-magnetic portions of such sleeve in the second embodiment may be made of stainless steel as well as of Inconel.

What is claimed is:

1. In a rotary electrical apparatus having a stator and a rotor with a radial air gap between the adjacent peripheries of the stator and rotor, the improved rotor which comprises a rotor shaft, a flux carrier ring telescoped over the shaft, a ring shaped permanent magnet telescoped over the flux carrier ring, said magnet being formed of a plurality of closely assembled sections and having a plurality of equally spaced first magnetic poles of alternating polarity at its radially outer surface and a plurality of second magnetic poles adjacent the flux carrier ring, said second poles being generally radially aligned with respective first poles and of opposite polarity therefrom, and means securing the magnet to the rotor shaft including a radially thin metallic sleeve tightly embracing the peripheral surface of the rotor in said air gap.

2. Apparatus as defined in claim 1 wherein said sleeve is heat shrunk onto the rotor.

3. Apparatus as defined in claim 1 comprising non-magnetic annular members affixed to the rotor shaft and overlying the opposite ends of the magnet, said members having the same outer diameter as the magnet and being tightly embraced by said sleeve.

4. Apparatus as defined in claim 3 wherein the means for securing the magnet to the rotor shaft further comprises layers of adhesive between the interfaces of said magnet sections, between the interfaces of said annular members and said magnet and between the interfaces of said flux carrier ring and said magnet.

5. Apparatus as defined in claim 4 comprising common means for securing each said annular member, said shaft and said flux carrier ring together.

6. Apparatus as defined in claim 5 wherein said common means consists of a brazed joint.

7. Apparatus as defined in claim 1 wherein said sleeve has alternating magnetic and non-magnetic portions circumferentially distributed thereabout, said magnetic portions overlying the magnetic poles of the magnet.

8. Rotary electrical apparatus having a stator and a rotor, the rotor having a plurality of evenly distributed, radially oriented magnetic poles of alternating polarity at its radially outer surface, the stator having a plurality of first and second pole pieces alternating circumferentially with each other and evenly distributed about its inner periphery, the number of pole pieces of the stator equaling the number of magnetic poles on the outer surface of the rotor, and a coil wound about each first pole piece of the stator, the second pole pieces being devoid of coils.

9. Electrical apparatus according to claim 8, wherein at least the circumferentially consecutive coils of some sets of two or more of said coils are wound in the same direction and are connected in series.

10. In a rotary electrical apparatus having a stator and a rotor, the improved rotor which comprises a rotor shaft having a flux carrier ring secured thereto, a ring shaped permanent magnet telescoped over the flux carrier ring, said magnet having a plurality of equally spaced first magnetic poles of alternating polarity at its radially outer surface and a plurality of second magnetic poles adjacent the flux carrier ring, said second poles being generally radially aligned with respective first poles and of opposite polarity therefrom, and means securing the magnet to the rotor shaft comprising a layer of cured rigid adhesive between the inner surface of the magnet and the flux carrier ring.

11. Electrical apparatus according to claim 10, comprising non-magnetic annular members affixed to the rotor shaft and overlying the opposite ends of the magnet, and wherein the means securing the magnet to the rotor shaft comprises layers of cured rigid adhesive between the ends of the magnet and the respective annular members.

12. Electrical apparatus according to claim 10, wherein the magnet is ceramic.

13. Electrical apparatus according to claim 12, comprising non-magnetic annular members affixed to the rotor shaft and overlying the opposite ends of the magnet, and wherein the means securing the magnet to the rotor shaft further comprises layers of cured rigid adhesive between the ends of the magnet and the respective annular members.

14. Electrical apparatus as defined in claim 10 wherein the magnet is formed of a plurality of closely assembled, generally arcuate sections having the interfaces thereof in generally radial planes, said sections of the magnet being secured together at said interfaces by layers of cured rigid adhesive.

15. Electrical apparatus according to claim 14, comprising non-magnetic annular members affixed to the rotor shaft and overlying the opposite ends of the magnet, and a radially thin metallic sleeve telescoped over the magnet and the annular members and tightly embracing their peripheral outer surfaces.

16. Electrical apparatus according to claim 15 wherein the means for securing the magnet to the rotor shaft further includes layers of cured rigid adhesive between the ends of the magnet and said annular members.

17. Electrical apparatus as defined in claim 10 wherein the means for securing the magnet to the rotor further comprises a radially thin metallic sleeve tightly embracing the magnet.

18. Electrical apparatus as defined in claim 17 wherein said sleeve has alternating magnetic and non-magnetic portions circumferentially distributed thereabout, said magnetic portions overlying said first magnetic poles of the magnet.

19. Electrical apparatus according to claim 15, wherein the sleeve is heat shrunk about the peripheries of the magnet and the annular members.

20. Electrical apparatus according to claim 15, wherein said sleeve has alternating magnetic and non-magnetic portions spaced angularly thereabout, said magnetic portions overlying said first magnetic poles of the magnet.

21. In a rotary electrical apparatus having a stator and a rotor, the improved rotor which comprises a rotor shaft, a cylindrical permanent magnet surrounding the shaft, said magnet having a plurality of evenly distributed magnetic poles of alternating polarity at its radial outer surface and an equal plurality of second magnetic poles adjacent the inner periphery thereof, said second poles being generally radially aligned with respective first poles and of opposite polarity therefrom, and means securing the magnet to the rotor shaft including a radially thin metallic sleeve tightly embracing the outer peripheral surface of the magnet.

22. Electrical apparatus as defined in claim 21 wherein said sleeve has alternating magnetic and non-magnetic portions circumferentially distributed thereabout, said magnetic portions overlying said first magnetic poles of the magnet.

23. In a rotary electrical apparatus having a stator and a rotor, the improved rotor which comprises a rotor shaft having a flux carrier ring secured thereto, a ring-shaped permanent magnet telescoped over the flux carrier ring, said magnet being formed of a plurality of generally similar sections bounded by generally radial planes and secured together by layers of cured rigid adhesive between their confronting surfaces, and further having a plurality of equally spaced first magnetic poles of alternating polarity at its radially outer surface and a plurality of second magnetic poles adjacent the flux carrier ring, said second poles being generally radially aligned with respective first poles and of opposite polarity therefrom, and means securing the magnet to the rotor shaft comprising non-magnetic annular members affixed to the rotor shaft and overlying the opposite ends of the magnet and a sleeve telescoped over and heat shrunk about the peripheries of the magnet and the annular members to tightly embrace their peripheral outer surfaces.

References Cited
UNITED STATES PATENTS

| | | | |
|---|---|---|---|
| 3,169,203 | 2/1965 | Lavin | 310—156 |
| 3,221,194 | 11/1965 | Blackburn | 310—156 |
| 3,246,187 | 4/1966 | Iemura | 310—156 |
| 3,292,126 | 12/1966 | Palm | 310—156 |
| 3,299,335 | 1/1967 | Wessels | 310—45 |
| 3,334,254 | 8/1967 | Kober | 310—156 |

WARREN E. RAY, Primary Examiner

R. SKUDY, Assistant Examiner

U.S. Cl. X.R.

310—262, 271